US010253925B2

(12) United States Patent
Mackereth et al.

(10) Patent No.: US 10,253,925 B2
(45) Date of Patent: Apr. 9, 2019

(54) MOUNTING DEVICE FOR PLUMBING OR ELECTRICAL EQUIPMENT

(71) Applicant: Bristan Group Limited, Dordon, Tamworth (GB)

(72) Inventors: Paul James Mackereth, Ansley (GB); Luke McGowan, Burton Upon Trent (GB); Xorge Castro Pelayo, Cambridge (GB); Stuart Curtis, Sawtry (GB); Benjamin John Strutt, Knapwell (GB)

(73) Assignee: Bristan Group Limited, Tamworth, Staffordshire (GB)

( * ) Notice: Subject to any disclaimer, the term of this patent is extended or adjusted under 35 U.S.C. 154(b) by 486 days.

(21) Appl. No.: 14/954,231

(22) Filed: Nov. 30, 2015

(65) Prior Publication Data

US 2016/0156167 A1 Jun. 2, 2016

(30) Foreign Application Priority Data

Dec. 1, 2014 (GB) .................................. 1421318.5

(51) Int. Cl.
*F16L 3/00* (2006.01)
*F16M 13/02* (2006.01)
*H02G 3/10* (2006.01)
*H02G 3/08* (2006.01)

(52) U.S. Cl.
CPC .............. *F16M 13/02* (2013.01); *H02G 3/10* (2013.01); *H02G 3/086* (2013.01); *Y10T 137/698* (2015.04)

(58) Field of Classification Search
CPC ............... E03C 1/021; Y10T 137/6969; Y10T 137/698; Y10T 137/6984

USPC .................................................. 220/3.94, 4.21
See application file for complete search history.

(56) References Cited

U.S. PATENT DOCUMENTS

| 3,609,774 A | * | 10/1971 | Allgood | E03C 1/021 137/359 |
| 4,942,896 A | * | 7/1990 | Slusser | E03C 1/01 137/360 |
| 5,247,962 A | * | 9/1993 | Walker | F16L 25/065 137/360 |
| 5,253,670 A | * | 10/1993 | Perrott | E03C 1/296 137/247.25 |
| 5,276,588 A | * | 1/1994 | Repplinger | H04M 1/0249 292/300 |
| 5,555,907 A | * | 9/1996 | Philipp | E03C 1/02 137/312 |

(Continued)

*Primary Examiner* — Robert K Arundale
(74) *Attorney, Agent, or Firm* — Faegre Baker Daniels LLP

(57) ABSTRACT

A mounting device for mounting plumbing or electrical equipment to a surface is disclosed. The device has a substantially planar body, comprising an engagement arrangement, for engagement with the equipment to be mounted to the mounting device; an opening for allowing passage of an electrical wire and/or a pipe through the plane of the body; alignment means arranged to allow a user to identify a correct location of the opening relative to pipework or cabling fixed to, or protruding from, the surface; and a substantially visually transparent fixing region configured to allow a user to identify a fixing point on the surface while looking through the fixing region, and to locate fixing means in the surface at the fixing point, through the fixing region, to fix the mounting device to the surface.

20 Claims, 11 Drawing Sheets

(56) References Cited

U.S. PATENT DOCUMENTS

| | | | | |
|---|---|---|---|---|
| 5,875,812 A * | 3/1999 | Miller | F16L 5/00 | 137/360 |
| 6,085,780 A * | 7/2000 | Morris | F16K 27/003 | 137/315.01 |
| 6,757,589 B1 * | 6/2004 | Parker | F16K 37/0075 | 137/624.11 |
| 7,308,907 B2 * | 12/2007 | Ouyoung | E03C 1/021 | 137/360 |
| 7,357,148 B1 * | 4/2008 | Gibson | E03C 1/021 | 137/360 |
| 2002/0134431 A1 * | 9/2002 | Kopp | A47L 15/4217 | 137/360 |
| 2004/0112433 A1 * | 6/2004 | Dicosola | E03C 1/021 | 137/360 |
| 2005/0067017 A1 * | 3/2005 | Condon | E03C 1/021 | 137/360 |
| 2007/0007287 A1 * | 1/2007 | Seo | F16B 5/0664 | 220/4.21 |
| 2010/0000614 A1 * | 1/2010 | Zahuranec | E03C 1/021 | 137/360 |
| 2012/0042963 A1 * | 2/2012 | Sanzone | E03C 1/021 | 137/315.01 |
| 2015/0000758 A1 * | 1/2015 | Randall | A61M 1/1656 | 137/15.01 |
| 2015/0197924 A1 * | 7/2015 | Whitehead | E03C 1/021 | 220/3.3 |
| 2015/0259891 A1 * | 9/2015 | Ismert | E03C 1/12 | 137/360 |
| 2015/0323097 A1 * | 11/2015 | Stoltz | E03D 11/00 | 137/2 |
| 2018/0073223 A1 * | 3/2018 | Colombo | E03C 1/021 | |

\* cited by examiner

MOUNTING DEVICE FOR PLUMBING OR ELECTRICAL EQUIPMENT

CROSS-REFERENCE TO RELATED APPLICATION

This application claims priority to United Kingdom Patent Application No. GB1421318.5, filed on Dec. 1, 2014, the disclosure of which is expressly incorporated by reference herein.

TECHNICAL FIELD

The present invention relates to a mount for attaching an item of plumbing or electrical equipment to a surface, more particularly to a generally planar wall or ceiling. More particularly, the invention relates to a mounting device which is arranged to permit a user to re-use pre-formed mounting holes to mount plumbing equipment to a surface, and a related method.

BACKGROUND TO THE INVENTION

It is often desirable to mount an item of plumbing or electrical equipment to a surface. Most commonly, particularly in domestic settings, it is desirable to mount plumbing or electrical equipment to fixed surface such as a wall, or in some cases to a floor or ceiling. In most instances, the installation procedure will involve forming holes in a surface for receiving fixing means such as screws, offering up the item to be mounted, or mounting plates for the item to be mounted, and inserting fixing means through holes in the item or mounting plate, into the fixing holes, to retain the item to the wall or ceiling. There are instances where an item needs to be replaced with a newer item and in these instances, it can be desirable to re-use fixing holes which have already been formed for the item which is being replaced. Further, one of the most time-consuming aspects of an installation process can be accurately measuring up locations for fixing holes to be formed and ensuring that the holes are appropriately formed at the desired locations, as defined by a set of fixed mounting points on the equipment to be mounted. Even when care is taken, the hole-forming equipment, such as a hand held drill, can often 'wander' and so the hole may ultimately not be precisely in the initially planned location. Further, it can often be desirable to form the fixing hole or holes at a particular point, for example at a junction between bricks or tiles of a wall or at a particular location relative to pipework or joists in a wall or ceiling. It is not therefore always possible to form a hole where it would most ideally be formed for a particular mounting plate or fixed-location fixing point of an item.

SUMMARY OF THE INVENTION

The present invention seeks to address these and other drawbacks of the prior art, and in doing so, the present invention provides a mounting device for mounting plumbing or electrical equipment to a surface, comprising:

a body, comprising:

an engagement arrangement for engagement with the product to be mounted on the mounting device;

an opening for allowing passage of a wire and/or a pipe through the plane of the body;

a fixing region configured to allow a user to locate fixing means in the fixing point, through the fixing region, to fix the mounting device to the surface; and wherein the engagement arrangement is a slidable engagement arrangement, the mounting device further comprising connector receiving means, shaped and configured to receive on the mounting device an adaptor for connecting a pipe or an electrical connection to the equipment, to deliver media to the equipment, so that a connection axis of the adaptor is arranged in a direction of the sliding motion, to permit the equipment to be mounted to the mounting device and the adaptor to be connected to a corresponding media connector on the equipment, in a single sliding motion.

The present invention therefore permits a user to mount a piece of plumbing or electrical equipment to a surface such as a wall or ceiling, using fixing points on the wall or ceiling which are located at any point in the visually transparent fixing region, by looking through the fixing region to identify the fixing point. This, combined with the alignment means for allowing the user to correctly identify the required location of the opening and the body of the mounting device, allows a user to install a piece of equipment at the necessary location relative to electrical wire and/or pipework, using either new or existing fixing points at substantially any point on the surface to which the equipment is to be mounted. Installation of equipment is therefore a faster and more efficient process in view of the features of the present invention.

In a further aspect, the invention provides a mounting device for mounting plumbing or electrical equipment to a surface, comprising a substantially planar body, the body comprising an engagement portion, for engagement with the equipment to be mounted to the mounting device; an opening for allowing passage of an electrical wire and/or a pipe through the plane of the body; alignment means arranged to allow a user to identify a correct location of the body relative to pipework or electrical wiring fixed to, or protruding from, the surface; and a visually transparent fixing region configured to allow a user to identify a fixing point on the surface while looking through the fixing region, and to locate fixing means in the surface at the fixing point, through the fixing region, to fix the mounting device to the surface.

The preferably visually transparent, fixing region may comprise a transparent, semi-transparent or translucent material. This can allow the fixing region to be formed from a constant layer of material, which is substantially planar and preferably of uniform thickness across at least a majority of the fixing region, while still allowing the user to see through the visually transparent region to identify the necessary fixing point on the surface. Truly transparent material allows the clearest and easiest identification of fixing points in a surface, such as pre-formed holes, although a semi-transparent or translucent material can still allow a user to identify areas of different contrast which reveal, e.g. a dark region indicating a hole in a light coloured wall or ceiling, or light passing through a hole in a dark wall or ceiling or other surface.

The transparent material may preferably be penetrable by a self-tapping screw to fix the mounting device to the surface. This avoids the need for a user to use hole forming equipment, such as a drill to form holes in the device for the fixing means to pass through.

The device may further comprise an array of pre-formed openings formed in the fixing region, for receiving fixing means for fixing the mounting device to the surface. This can help the user avoid the need to form holes themselves.

The preformed openings may be formed at predetermined locations corresponding to a plurality of different arrays of fixing points corresponding to fixing points of a plurality of different items of plumbing or electrical equipment. This plurality of different arrays of preformed holes allows the mounting device to be mounted to the surface using one of several arrays of pre-formed fixing points, each of which may correspond to fixing points for any one of a number of different items of plumbing or electrical equipment. This can help a new item of plumbing or electrical equipment to be located on the surface using fixing points, such as drilled holes in the surface, which were previously used for a different item of plumbing or electrical equipment.

The visually transparent fixing region may comprise a series of openings which are spaced apart to permit a user to identify the fixing point through the openings and to locate fixing means in the fixing point through one of the openings. The visually transparent region can therefore be made from a non-transparent material, but where a sufficient frequency of openings is provided, the region, when viewed by a user, is substantially visually transparent, and a user will be able to easily identify a fixing point by looking through the openings, to the surface behind the fixing region. Regular slots, having a width equal to or less than a standard screw head width, with a gap between the slots of the same distance or less can provide this function. A typical dimension for a screw head used in domestic installations of plumbing and electrical equipment is between around 7 mm and 10 mm. Preformed opening for use with screws having a head diameter of 7 mm to 10 mm can usefully be around 5 mm. A screw head to opening diameter ratio may therefore be between around 7:5 to 10:5 (2:1) or greater. These ratios, or an overlap of the head over the plate adjacent the opening in the region of 2 mm, can be implemented to attach the equipment to a surface and provide sufficient support to the equipment. Particularly large or heavy equipment may require greater overlap and/or larger screws, for example. This head width can usefully define the pitch, or number of slots per unit of distance, of the slots, in a direction across the width of the slots, such as a number of slots per meter or per centimeter. However, the actual width of the opening of the slots will be less than the head diameter, since the head must engage a part of the body to retain it between the head and the surface to which the device is mounted.

The openings may be elongate slots. Elongate slots permit fixing means to be located in the slots at substantially any location along the length of the slot.

The mounting device may comprise a first fixing region comprising a first series of slots extending in a first direction, and a second fixing region, comprising a second series of slots extending in a second direction, different from the first direction. Having slots extending in first and second directions allows further flexibility in the relative locations of the fixing means used to fix the device to the surface via the slots. This, in turn, results in increased flexibility in the different arrangements of pre-formed fixing points on a surface which can be usefully used to locate the mounting device at the appropriate location relative to pipework or electrical wires.

The slots may comprise curved slots, arcuate slots, concentric arcuate slots, or slots formed in a spiral arrangement. These various arrangements, used either alone, or in any combination, can further improve the flexibility of locations at which the item can be fixed to the surface via fixing means located in the fixing region of the mounting device.

At least one of the openings may comprise a shoulder for engaging a head of fixing means for fixing the mounting device to the surface. This can allow a head to be received within the depth of the mounting device, while allowing the shoulder to be retained to the surface by engaging the head of fixing means used to mount the mounting device to the surface.

A reinforcement member may extend across the plane of the fixing region. This can help to provide further strength to the transparent material or to the intermediate members located between the slots, to allow a sufficient degree of transparency while retaining a sufficient degree of strength to mount the equipment to the surface. Plural reinforcing members may extend across the plane of the fixing region to increase this additional strength.

The device may further comprise plural openings, each for allowing passage of an electrical wire and/or a pipe through the plane of the body at different locations on the body. This can allow the mounting device to be used with pipes or wires which are mounted to, or protrude from, the surface at a variety of different locations, and can allow the mounting device to be used with a greater variety of plumbing or electrical equipment.

The alignment means of the device may be located at or in the opening for allowing passage of an electrical wire and/or a pipe through the plane of the body. This can facilitate the alignment of the pipe or wire at the appropriate location during the mounting of the mounting device to the surface.

The alignment means may be removable. This feature can allow the alignment means to be removed to facilitate passage of pipework or electrical cabling through the opening without obstruction by the alignment means.

The invention further provides a mounting device for mounting plumbing or electrical equipment to a surface, comprising: a substantially planar body, comprising: an engagement arrangement for engagement with the product to be mounted on the mounting device; an opening for allowing passage of a wire and/or a pipe through the plane of the body; alignment means arranged to allow a user to identify a correct location of the opening relative to pipework or cabling fixed to, or protruding from, the surface; and a fixing region configured to allow a user to locate fixing means in the fixing point, through the fixing region, to fix the mounting device to the surface; the fixing region further comprising an array of pre-formed openings, for receiving fixing means for fixing the mounting device to the surface, the pre-formed openings being formed at predetermined locations corresponding to a plurality of different arrays of fixing points, corresponding to fixing points of a plurality of different items of plumbing or electrical equipment.

Where the array of preformed openings for receiving fixing means for fixing the mounting device to the surface are formed at predetermined locations corresponding to a plurality of different arrays of fixing points corresponding to fixing points of a plurality of different items of plumbing or electrical equipment, it may not be necessary for the fixing region to be visually transparent, since the preformed holes can be used to identify the necessary location for the fixing means in the mounting device.

The invention further provides a method of mounting plumbing or electrical equipment to a surface, comprising the steps of: providing a mounting device having a substantially planar body; locating the mounting device on the surface and aligning alignment means of the mounting device relative to a wire and/or a pipe to be connected to the equipment; looking through a visually transparent fixing region of the mounting device, to identify a fixing point on the surface; passing fixing means through the visually transparent fixing region, into the fixing point, to fix the mounting device to the surface; and mounting the equipment to an engagement arrangement for engagement with the product to be mounted on the mounting device.

The method may comprise looking through a visually transparent material in the fixing region. This can be advantageous, since the visually transparent material can allow the fixing point to be identified at any point in the fixing region, without obstruction by intermediate members forming slots.

Passing the fixing means through the visually transparent fixing region may comprise passing a self-tapping screw through the transparent material to fix the mounting device to the surface.

Passing the fixing means through the fixing region may comprise passing the fixing means through one of an array of preformed openings formed in the fixing region to fix the mounting device to the surface.

The preformed openings may be formed at predetermined locations corresponding to a plurality of different arrays of fixing openings corresponding to fixing points of a plurality of different items of plumbing or electrical equipment.

A visually transparent fixing region may comprise a series of openings spaced apart to permit the user to identify the fixing point and to locate fixing means in the fixing point through one of the openings. A sufficiently dense series of openings at relatively close locations can appear substantially visually transparent to the human eye and can thus allow the user to see through the fixing region to identify the necessary fixing point. For example, a spacing between centre points or edges of the openings equal to a width of a standard screw head may be beneficial. Useful exemplary values may range from around 7 mm to around 10 mm, for example. The gap provided by the openings may be in the region of 5 mm, but may usefully be in the range of around 2 mm to around 7 mm. A ratio of opening width to width of material between openings may be in the region of about 7:5 to 10:5 (2:1) or greater. This can give heads of fixing means, such as screw heads sufficient spacing and material in between fixing locations to adequately support the equipment, while providing a degree or transparency so that a user can see through the fixing region to identify fixing points on the surface.

The method may comprise placing first fixing means in a first fixing region which comprises a first series of slots extending in a first direction, and placing second fixing means in a second fixing region, comprising a second series of slots extending in a second direction, different from the first direction. This can allow increased flexibility of the location of installation of the device and its appropriate alignment with electrical wiring, cabling or pipework.

The slots may comprise curved slots or concentric arcuate slots, or slots formed in spiral arrangement, or any combination thereof. The method may comprise locating a head of fixing means against a shoulder or lip of one of the openings to fix the mounting device to the surface. This can allow a head to be received within the thickness of the mounting device, while allowing the shoulder to be retained between fixing means and the surface to which the device is mounted.

The method may further comprise passing a pipe or electrical wire through one of a plurality of openings, each for allowing a passage of a wire and/or a pipe through the plane of the body at different locations on the body. This can allow pipes and/or wires to be passed through the body at plural locations, either simultaneously, or to enable the mounting device to be used with different items of equipment, which require the pipes and/or wires to be received at different locations on the mounting device.

The alignment means may be located at or in the opening for allowing passage of a wire and/or pipe through the plane of the body. The method may comprise removing the alignment means after using the alignment means to align the mounting device relative to electrical wiring or pipework.

The invention further provides a method of mounting plumbing or electrical equipment to a surface, comprising the steps of:

providing a mounting device having a substantially planar body; locating the mounting device on the surface and aligning alignment means of the mounting device relative to a wire and/or a pipe to be connected to the equipment; identifying an opening in a fixing region of the mounting device corresponding to a pre-formed fixing point in the surface, the opening being one of an array of pre-formed openings for receiving fixing means for fixing the mounting device to the surface, the pre-formed openings being formed at predetermined locations corresponding to a plurality of different arrays of fixing openings arranged to correspond to fixing points of a plurality of different items of plumbing or electrical equipment; passing fixing means through the identified opening, into the fixing point, to fix the mounting device to the surface; and mounting the equipment to the mounting device corresponding engagement means on the equipment and on the mounting device.

The method may further comprise the step of connecting the wire and/or the pipe at a location aligned with the alignment means. Connecting the wire and/or pipe to the equipment mounted to the surface via the mounting device is an easier task in view of the fact that the mounting device allows the user to ensure that the equipment will be properly aligned with the pipe or wire while locating the mounting device on the surface.

The engagement arrangement of the invention may be a slidable engagement arrangement. The mounting device may further comprise connector receiving means. The connector receiving means may preferably be shaped and configured to receive a connector, so that a connection axis of the connector is arranged in a direction of the sliding motion of the slidable engagement arrangement. This can permit the equipment to be mounted to the mounting device and the connector to be connected to the equipment in a single sliding motion.

The invention further provides a mounting device for mounting plumbing or electrical equipment to surface, comprising:

a substantially planar body, comprising:

an engagement arrangement for engagement with the product to be mounted on the mounting device;

an opening for allowing passage of a wire and/or a pipe through the plane of the body;

a fixing region configured to allow a user to locate fixing means in the fixing point, through the fixing region, to fix the mounting device to the surface;

wherein the engagement arrangement is a slidable engagement arrangement, the mounting device further comprising connector receiving means, which are preferably integrally formed, and which are shaped and configured to receive a connector, so that a connection axis of the connector is arranged in a direction of the sliding motion, to permit the equipment to be mounted to the mounting device and the connector to be connected to the equipment in a single sliding motion.

The device of these aspects of the invention allows a fast and efficient installation procedure, enabling equipment to be mounted to a mounting device and media inlet connections to be connected in a single motion.

A connector may be mounted to the mounting device via the connector receiving means. The connector may alternatively be integrally formed with the mounting assembly.

The device may further comprise an adaptor connected to the connector and mountable to the mounting device in a plurality of configurations, for connecting the equipment, via the adaptor, to media at a plurality of different locations relative to the mounting device.

This improves the general flexibility of the mounting device and adaptor arrangement to various installation situations, with media being delivered to the equipment at a range of locations relative to the mounting device. The adaptor may be rotatable about the connection axis of the connector, between first and second configurations, in order to connect the media at first and second locations relative to the mounting device. This helps to facilitate the adaptation of the mounting device and adaptor assembly to various installation configurations.

Any of the methods of the invention may include sliding equipment into slidable engagement with the mounting device and simultaneously sliding a connector of the equipment into engagement with a connector on the mounting device, to connect media to the equipment via the connector on the mounting device. This results in a faster, more repeatable and more efficient installation procedure.

The invention further provides a method of mounting plumbing or electrical equipment to a surface, comprising the steps of:

providing a mounting device having a substantially planar body:

locating the mounting device on the surface and aligning alignment means of the mounting device relative to a wire and/or a pipe to be connected to the equipment;

fixing the mounting device to the surface via fixing means; and mounting the equipment to the mounting device via corresponding engagement means on the equipment and on the mounting device, wherein mounting the equipment to the mounting device comprises:

aligning the equipment to be substantially parallel with a plane of the mounting device, such that a media connector of the equipment is coaxially aligned with an adaptor assembly for delivering media to the media connector of the equipment, wherein the connection axis of the connector is substantially parallel to the plane of the mounting device; and sliding the equipment into slidable engagement with the mounting device, in a direction of the connection axis of the connector and simultaneously sliding the media connector of the equipment into engagement with the adaptor assembly, to connect media to the equipment via the adaptor assembly.

The method or methods of the invention may comprise connecting an adaptor connected to the connector, and mounted to the mounting device, to media, so that the media is connected to the equipment when the equipment is slidable mounted on to the mounting device.

The adaptor may be rotatable about the connection axis of the connector, between first and second configurations, in order to connect the media at a first location or at a second location relative to the mounting device.

The invention further provides, either separately or in combination with the above features, a mounting device comprising an adjustable media connection, for media such as electricity, or water or gas or other electrical or fluid input media, the connection being configurable to receive media in any one of a plurality of predefined locations relative to the mounting device and from a plurality of directions relative to the mounting device, and/or relative to a surface to which the mounting device is mounted.

The invention further provides a method of mounting plumbing or electrical equipment to a surface using fixing points for an item previously mounted to the surface, comprising the steps of:

removing a first piece of equipment from a surface to leave existing fixing points for the first piece of equipment exposed;

providing a mounting device having a substantially planar body;

locating the mounting device on the surface and aligning alignment means of the mounting device relative to a wire and/or a pipe to be connected to a second piece of equipment;

looking through a visually transparent fixing region of the mounting device, to identify at least one of the existing fixing points on the surface;

passing fixing means through the visually transparent fixing region, into the existing fixing point, to fix the mounting device to the surface;

mounting a second piece of equipment to an engagement arrangement of the mounting device, to mount the second piece of equipment to the surface via the mounting device and the existing fixing points; and connecting the wire or pipe to the second piece of equipment.

Any of the methods of the invention may comprise drilling a hole through a transparent portion of the mounting device, preferably at a location corresponding to location(s) of one or more existing fixing holes in the surface to which the mounting device is to be attached.

Any or all of the above features of the invention can be combined in any combination to provide advantages which will become further apparent on reading the following detailed description.

BRIEF DESCRIPTION OF THE DRAWINGS

The invention will now be described, by way of example only, with reference to the accompanying drawings in which.

DETAILED DESCRIPTION OF THE DRAWINGS

Figure 1:
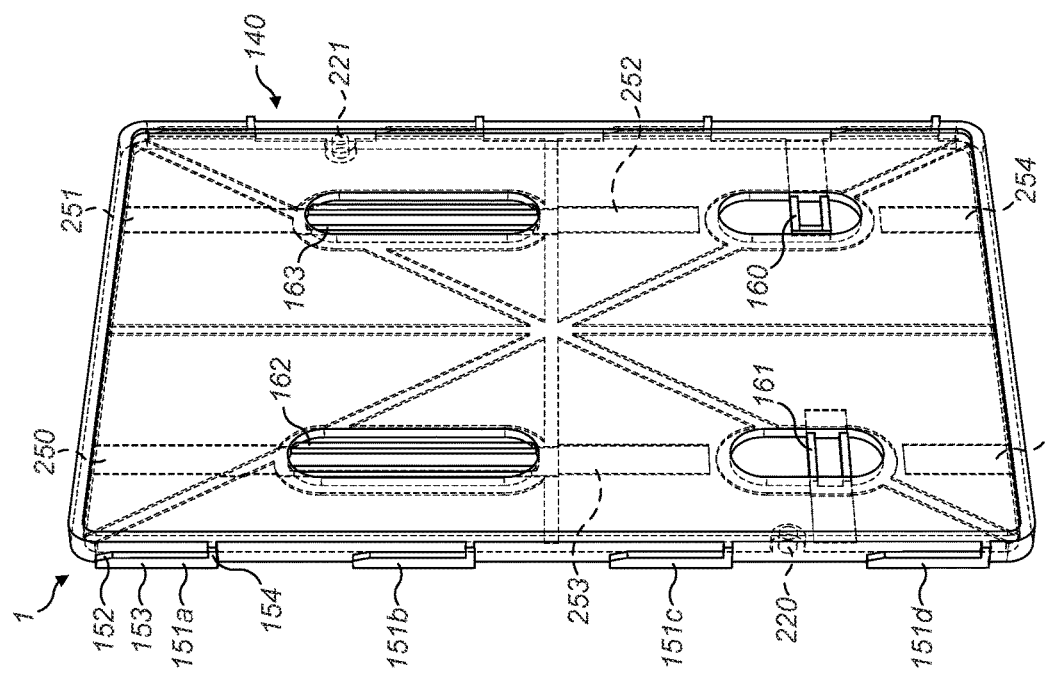
FIG. 1 shows a mounting device of the present invention, viewed from an equipment side.

FIG. 1 shows a mounting device according to the present invention. The device comprises a substantially planar body 100. The planar body comprises a fixing region 110. This fixing region 110 may be divided into a plurality of fixing regions separately numbered 110 to 124 in the Figure. In the example shown, the fixing regions are made from a transparent material. Making the fixing regions from a transparent material allows a user to look through the fixing regions and to see the surface to which the mounting plate is going to be attached through the fixing regions. In practice, this means that the mounting device 1 can be used to mount equipment to a surface, by using fixing points which are pre-formed in the surface at locations corresponding to substantially any point within the fixing regions 110 to 124.

The device comprises a front, or equipment-facing, face 130, which can be seen in full in FIG. 1. The device also comprises a rear, or surface-facing, face 140, which cannot be seen in FIG. 1, but which is shown in full in FIG. 2. Visible from the front face 130, are plural visual alignment means 160, 161, 162 and 163. These visual alignment means are located at specifically chosen locations in relation to plumbing or electrical equipment which is to be mounted to the mounting device 1 when the mounting device 1 is mounted to a surface. A particular example of a piece of plumbing equipment is an electrical shower unit. An electrical shower unit needs two separate media, or utilities, to be delivered to it. The first of these is water, and the second is electricity to control heat provided to and/or the flow of the water. Other plumbing equipment may need gas to be delivered, such as gas fuelled showers or boilers. When locating the mounting device 1 on a wall, water and electricity, generally termed the media for delivery to the device, would often already have been installed in the surface at certain defined locations.

Therefore, for the pipework or wiring affixed to or protruding from the surface to which the shower unit is to be mounted to be delivered to the equipment at the desired location, then the mounting device 1 to which the shower unit will be mounted, must also be located at an appropriate location on the surface, relative to the pipework or electrical cabling.

The alignment means 160, 161, 162 and 163 allow a user to align pipework in particular with the mounting plate, so that when the shower unit is mounted to the mounting plate, the pipework is appropriately aligned relative to a connection point on the shower unit itself. Each shower unit may have several possible connection points, which can be used in different installation situations and these can be indicated by plural alignment means as shown in the figure. Alternatively, the multiple alignment means can be useful where the mounting plate is for use with a number of different models of e.g. boilers or shower units, which may each have different connection locations for pipework or electrical cabling. In general, shower units may have water delivered to them from a plurality of different optional directions, for example those indicated by arrows 170, 171, 172 and 173. Therefore, an example of a pipe indicated at 180 can be aligned relative to alignment means 161 in order to ensure that a shower unit, once mounted to the mounting device 1 is correctly aligned with the pipe 180. A fixing region, or any part of the mounting device 1, may be provided with one or more reinforcement portions as numbered 191 to 196. In the illustrated example, the lateral reinforcement member 191 extends substantially across a centre of the fixing region. A second lateral reinforcement member 192 extends in a direction substantially perpendicular to member 191 across the fixing region, while diagonal reinforcement members 193 and 194 may additionally or alternatively be provided. Further longitudinal reinforcement members 195 and 196 may also be provided. Each and all of these members help to improve the general stiffness of the fixing region to improve its suitability for mounting equipment to a surface in a more rigid manner.

One or more openings can also be provided in the device, preferably adjacent to, directly adjacent to, or within, the fixing region, as indicated at 201, 202, 203 and 204. These openings can also have reinforcement regions of increased thickness perpendicular to the plane of the fixing region located around them as indicated at 211, 212, 213 and 214. Any or all of the reinforcing members 191 to 196 may be formed as areas of increased depth of the fixing region, such that a greater thickness of material is provided in these regions to provide increased bending stiffness. The reinforcement members may be formed separately from the device and attached thereto, or preferably they are reinforcement portions integrally formed as part of the device, for example by moulding them into the fixing region or regions. The device 1 may further comprise a surround 101 of increased strength compared to the fixing region(s) to provide stiffness to the device. This stiffening surround may be of a greater depth in the plane of the device than the fixing region, or generally of greater stiffness in order to increase to overall stiffness of the device 1.

Figure 2:
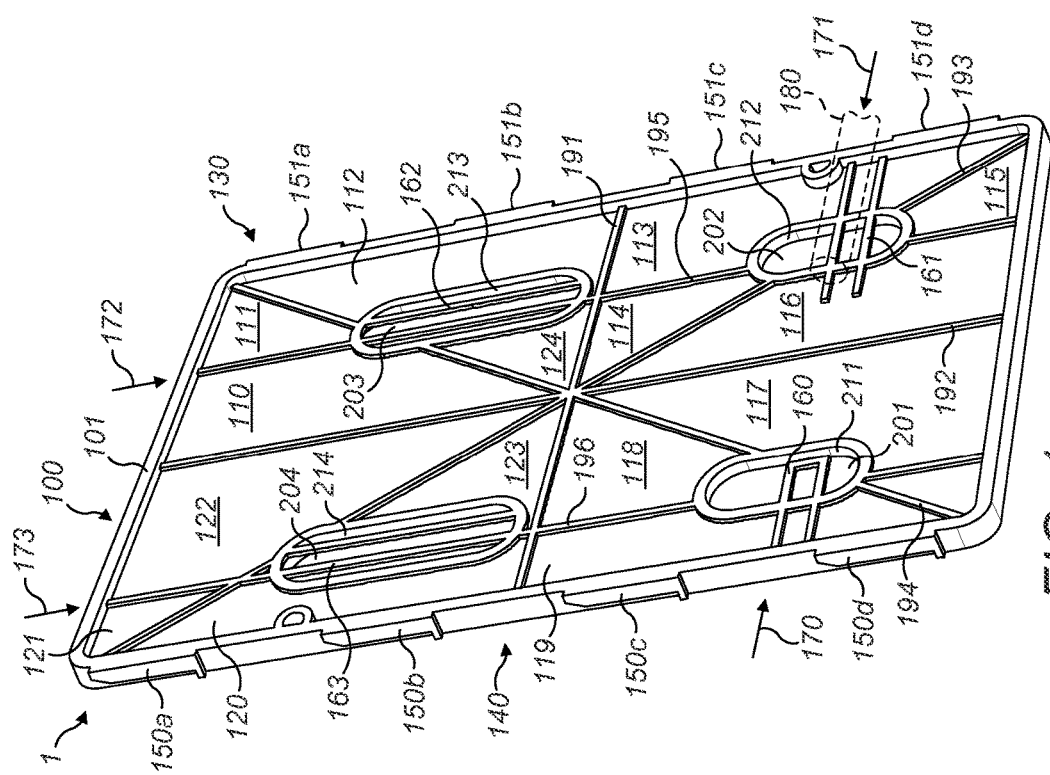
FIG. 2 shows a mounting device of the invention shown from the surface-facing side.

FIG. 2 shows a view of the device of FIG. 1 from the rear or surface-facing side 140 of the device 1 of FIG. 1. As the device is made from a transparent material, the features shown on the front, or equipment-facing, face 130 in FIG. 1 can be seen in dotted lines through the body of the device 1. Further detail of the equipment mounting arrangements 151a to 151d can be seen. The arrangements are configured for sliding engagement with corresponding sliding engagement means of the equipment to be mounted to the device 1. Further, engagement portions 220 and 221 are provided, through which engagement means may be fitted, to engage the equipment to the mounting device 1 to prevent it from slidably disengaging from the mounting device 1 after mounting to a surface via device 1. The engagement arrangement 151 comprises a front, sloped, portion for guiding corresponding engagement means to one side of a straight portion 153, and a stop 154 is provided, at an end of the straight portion 153 distal from the sloped portion 152, to prevent the equipment from sliding past the preferably straight retention portion 153. This configuration is preferably repeated on all of the features 150a to 150b and 151a to 151d. This array of plural engagement arrangements can help to ensure a secure attachment of the equipment to the mounting device 1. As can be seen in FIG. 2, in addition to indicator means 160, 161, 162 and 163, one or more of further indicator means 250, 251, 252, 253, 254 and 255 may be provided on or in the fixing region of the body and so can be generally formed as areas of increased or reduced thickness of the fixing region. The outer boarders of these areas can act as alignment features, for visual identification by a user mounting equipment to a wall or ceiling or other surface. These indicator means can therefore indicate, to a user, a path which a pipe or wiring should follow in relation to the device 1 in order to be located at an appropriate position in relation to the equipment once the equipment is mounted to a surface.

Figure 3:
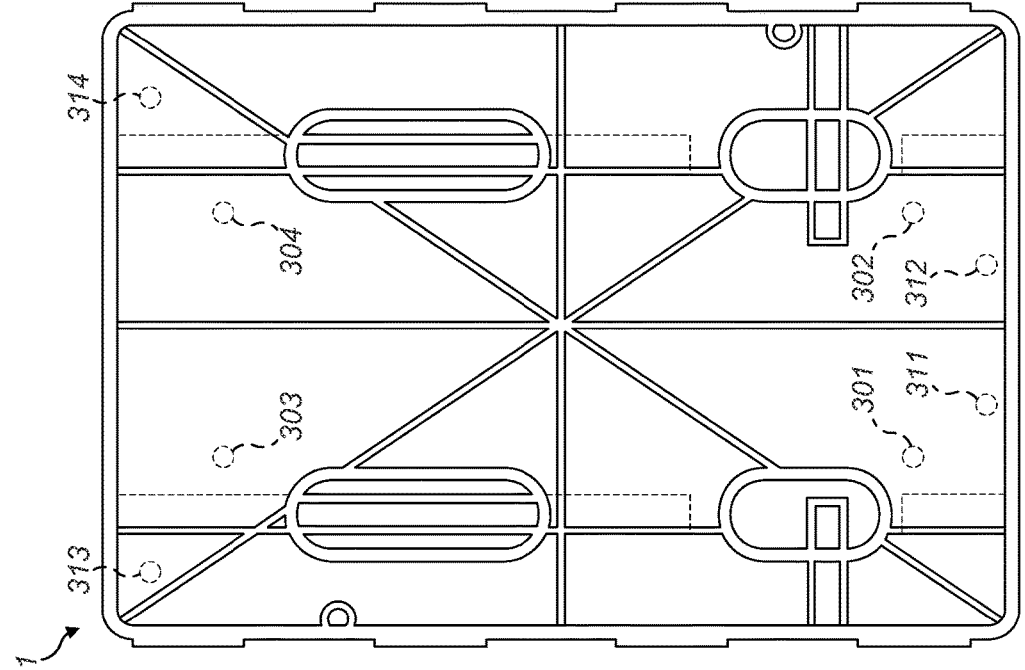
FIG. 3 shows an orthogonal view of the mounting device of FIGS. 1 and 2.

FIG. 3 shows an orthogonal view of the device 1 of FIGS. 1 and 2. The transparent fixing region can be made from a number of different transparent materials. As a particular example, if the fixing region is made from transparent polypropylene, then it has been found that for a plate thickness of up to around 10 mm, then a self-tapping screw can be usefully driven through the plate by a manual or handheld electric screwdriver in order to secure the body to a surface on the other side. In practice a material thickness of around 1 to 10 mm can be used, more preferably around 2 mm to around 4 mm. Alternatively, a transparent polycarbonate material could be used. However, the properties of this material do not generally allow a hole to be created by a self-tapping screw, rather it is necessary to use holes which are either drilled through the plate by a user using a drill, or preformed during the manufacturing process of the device 1.

An advantage of using materials which cannot be penetrated by self-tapping screws is that they may be stronger and stiffer and so they can be advantageous in certain applications, particularly where holes are preformed in a manufacturing process. It can be beneficial to provide a plurality of different arrays of holes in the fixing region(s) of the device. Further, if the plural different arrays of holes are provided at locations which correspond to the mounting holes used for an array of different items of plumbing or electrical equipment, then this can increase the usability of the device with various preformed fixing arrangements. For example, the plate can be used for mounting an item to a surface using holes which have already been previously formed for mounting another item to a surface. When replacing items of equipment this then removes the need for forming new mounting holes in a surface.

For example, a first array of holes indicated by dashed circles numbered 301 to 304 in FIG. 3 may be provided at an array of locations corresponding to the points or locations at which fixing means are located to mount a first piece of equipment to a wall. In this case, the invention permits any item which can be mounted to the mounting device 1 to be mounted to the wall using the array of openings 301 to 304 which are normally only configured to fix equipment A to the surface. The invention therefore allows a user to fix a new or second item to the surface using holes which have been formed in the surface to mount another, first, piece of equipment to the wall.

A second array of holes or openings, indicated by, for example, dashed circles 311, 312, 313 and 314 may further be provided. By providing the mounting device with preformed holes corresponding to the first array 301 to 304 the fixing points, and the second array 311 to 314 of fixing points, the device 1 can be used to mount plumbing or electrical equipment to a wall using holes which have already previously been used to mount either of the first or second items of equipment to the surface. The device can therefore render the process of replacing the a range of previous items of electrical or plumbing equipment with a new item of electrical or plumbing equipment faster and less cumbersome, by providing pre-formed openings at locations corresponding to fixing points used to mount one or more items of equipment which are to be replaced.

This can be illustrated by a scenario where a technician intends to replace a piece of equipment A with a replacement piece of equipment B. Piece of equipment A is fixed to a wall at an array of fixing points indicated by dashed circles 301 to 304. This array of points will be known as array A. In order to fix the replacement equipment to a surface using fixing holes already created in a surface to fix equipment A to the surface, the technician can made use of the device 1 of the invention, having preformed holes arranged at locations corresponding to array A.

A technician may also wish to replace a second piece of equipment, equipment B, which is fixed to a surface using fixing means located at an array of points indicated by dashed circles 311 to 314, known as array B. By providing a mounting device 1 with openings at locations defined by both array A and array B, the same mounting device can be used to mount a piece of equipment in replacement of either equipment A, or equipment B, without the need to form new fixing holes in the surface. This is because the device 1 is already provided with openings corresponding to those plural arrays A and B of fixing locations.

The provision of plural arrays of preformed holes therefore makes the device of the invention suited to use for replacing numerous items of electrical or plumbing equipment with any item which can be mounted to the device 1. It will become apparent in light of the preceding and the following description, that all of the embodiments described herein permit this flexibility of replacement of electrical or plumbing equipment by enabling the use of existing fixing holes to mount new equipment in place of old equipment.

FIGS. 4 to 8 show alternative arrangements which can provide the visually transparent fixing region for the device 1 of the device shown in FIGS. 1 to 3. Although the slotted structures shown in FIG. 4 onwards comprise the same type of slots across the whole area of the body, they may be combined or alternated in any combination across the fixing region or regions of the device 1 of FIGS. 1 to 3 to provide the most flexible options for fixing the arrangement to a surface.

In general, the slotted arrangements will therefore be combined with the one or more of any of the openings 201 to 204, indicator means 160 to 163 or 250 to 255, reinforcing members 191 to 196 and the surrounding frame 101 of FIGS. 1 to 3, along with the engagement means 150a to d and 151a to d, which may be combined with and/or replaced by other engagement means for mounting the equipment as described in relation to the following figures.

Figure 4:
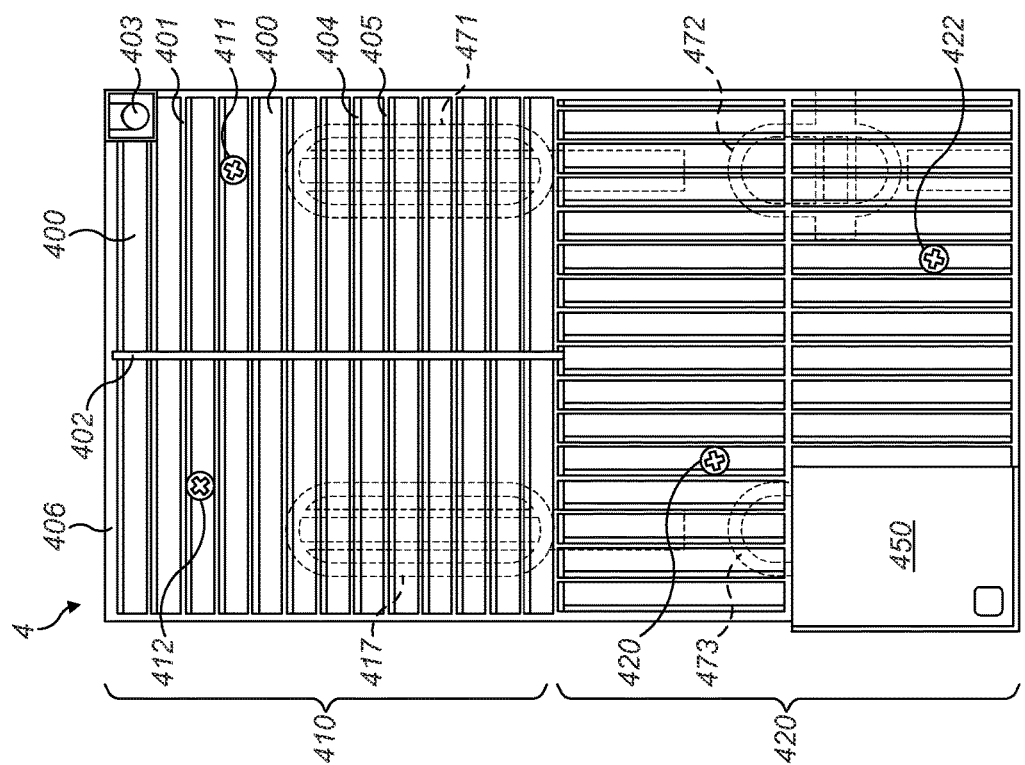
FIG. 4 illustrates an example of the device of the invention using spaced slots in the fixing region.

FIG. 4 shows how arrangements of parallel slots 400 interspersed with intermediate members 401 can be used to create a visually transparent fixing region through which it is possible to see, in order to identify a fixing point on a surface on the other side of the fixing region. This allows a user to hold up the device between himself and the surface to look through it and conveniently identify a fixing point on or in the surface. Any or all of the fixing regions 110 to 124 of the device of FIGS. 1 to 3 can therefore be provided with such slots as are illustrated in the device of FIG. 4. A reinforcing member 402 may be provided at a chosen location along the length of the slots 400 and intermediate members 401, in order to provide additional strength and stiffness to the intermediate members 401. An alternative form of equipment engaging arrangement is shown at 403, in the form of an opening having a reinforcing wall around it and a protruding engagement portion disposed within the reinforcing wall. Fixing means such as a screw or bolt may be placed in the engagement portion to fix equipment to the mounting device.

The illustrated example has a first fixing region 410, having elongate slots therein, which extend in a first direction. The device can also be provided with a second fixing region, comprising elongate slots which extend in a second direction, different from the first direction. The first and second directions may be substantially perpendicular to one another, or at any non-zero angle above zero and up to 90° relative to one another. A cutaway portion 450 of an item of equipment which may be attached to the device is also shown for illustrative purposes. As will be appreciated from the earlier description, it is possible to locate fixing means in any of the slots 400. Such fixing means may be a screw or a bolt, for attaching the device to a wall or ceiling, or any other substantially planar surface. Each slot comprises a shoulder 404 and an upstand 405. The shoulder 404 is arranged to engage the head of any fixing means such as a screw or a bolt used to attach the device 42 a wall. The upstand provides additional strength to the intermediate members 401 and also enables a head of any fixing means to be received within the depth of the device, between its front face, which may be defined by the top edges of the upstands and the surround 406 and its rear face, as is more clearly shown in FIG. 5.

As is shown by illustrative screw heads 411 and 412, 421 and 422, such fixing means can be located at any point in any of the elongate slots to retain the mounting device 42 to a surface using fixing points in the surface, located at substantially any location within the first and/or second fixing regions 410 and 420. The choice of locations is only limited by the pitch of the slots.

Returning to FIG. 4, the openings and alignment means of the device 1 of FIGS. 1 to 3 can be applied as indicated in dashed lines at 471, 472, 473 and 474. These can be integrally moulded with the device as shown. Alternatively, the general structure of the device 1 of FIGS. 1 to 3 may be provided with elongate slots as illustrated in either or both of the fixing regions 410 and 420 of the device 4 of FIGS. 4 and 5.

Figure 5:
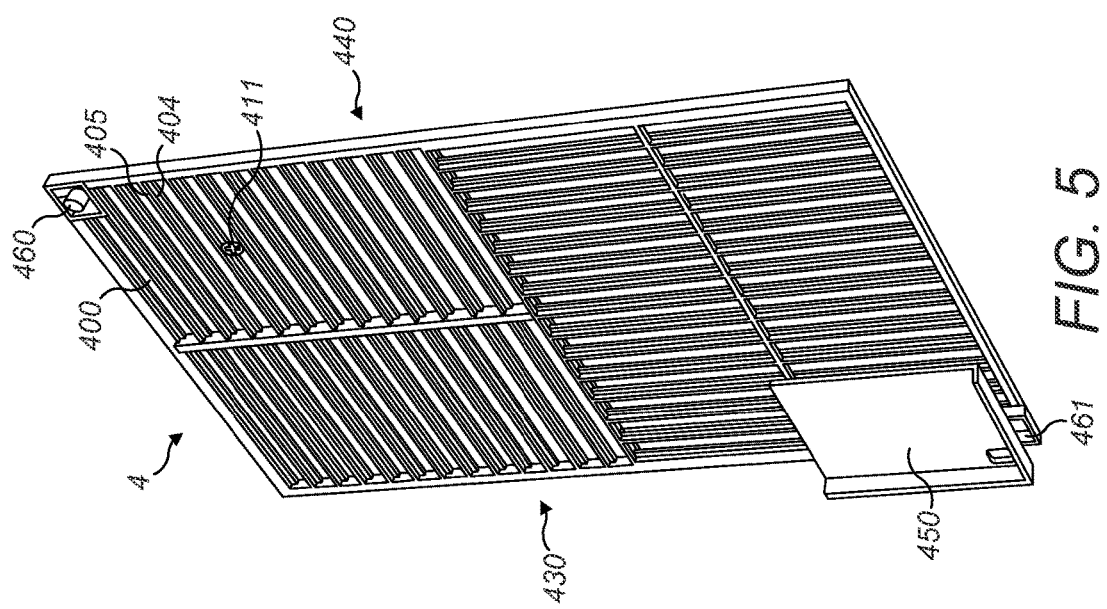
FIG. 5 shows the device of FIG. 4 in isometric view.

FIG. 5 illustrates a perspective view of the device 4 of FIG. 4, in which it can be more clearly seen how the intermediate members comprise a shoulder or lip 404 and an upstand 405 extending substantially perpendicularly to the plane of the slots 400. The device has a front, or equipment facing, face 430 and a rear, or surface-facing, face 440. The provision of the upstand 405 and the shoulder 404 permits fixing means such as screw head 411 to be received substantially between the front 430 and rear 440 faces of the device, in order that the front face 430 is substantially flat and unobstructed, which means that the equipment mounted to the device 4, a portion of which is illustrated at 450, can sit substantially flush against the device 4 when attached to it via engagement arrangements 460 and 461. In FIG. 5, the openings and alignment means are not shown, for clarity, but as indicated above, they can be additionally provided as shown in FIG. 4.

Figure 6:
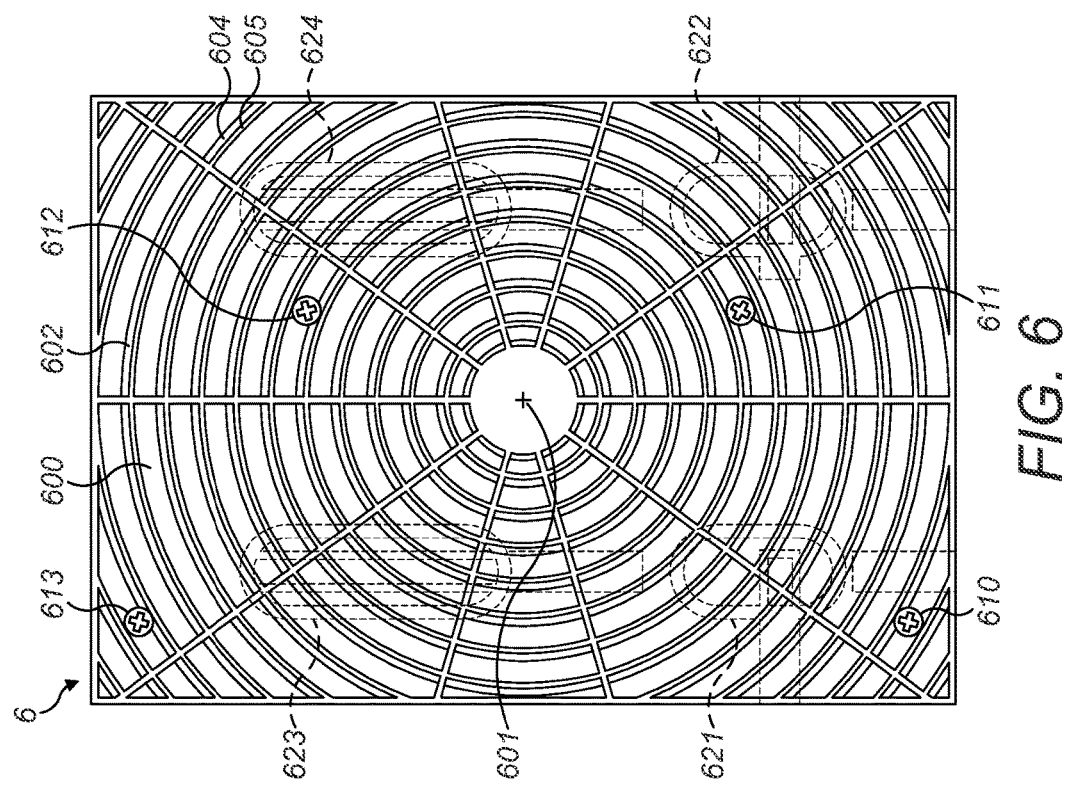
FIG. 6 shows a version of the device of the invention having concentric arcuate slots.

FIG. 6 shows a further alternative arrangement of slots which may be used in the fixing region or regions of the device of FIGS. 1 to 3. In this instance, the slots 600 are curved. Further, the curved slots 600 may be arcuate and may further be concentrically arranged around a common centre point 601. The curved slots 600 are provided with intermediate members 602, which act in a similar manner to the straight intermediate members 401 of FIG. 4. As described in respect of upstands 405 and shoulders or lips 404 of FIG. 4, the curved intermediate members of FIG. 6 are provided with an upstand 605 and a lip or shoulder 604 for engaging a screw head or other fixing means, to fix the device 6 to a wall or surface. The curved slot 600 of the device 6 can be combined with any of the slots illustrated in FIG. 4 or features of the fixing regions described in relation to the device of FIGS. 1 to 3. As illustrated in FIG. 6, the device can therefore be fixed to a surface using fixing means, such as screw heads 610, 611, 612 and 613, for example.

Figure 8:
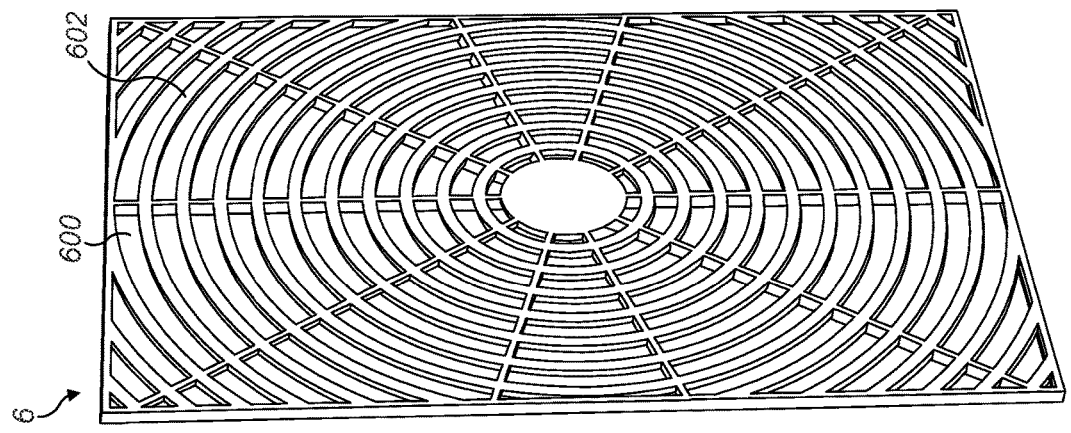
FIG. 8 shows an isometric view of a non-equipment side of the device of FIGS. 6 and 7.
Figure 7:
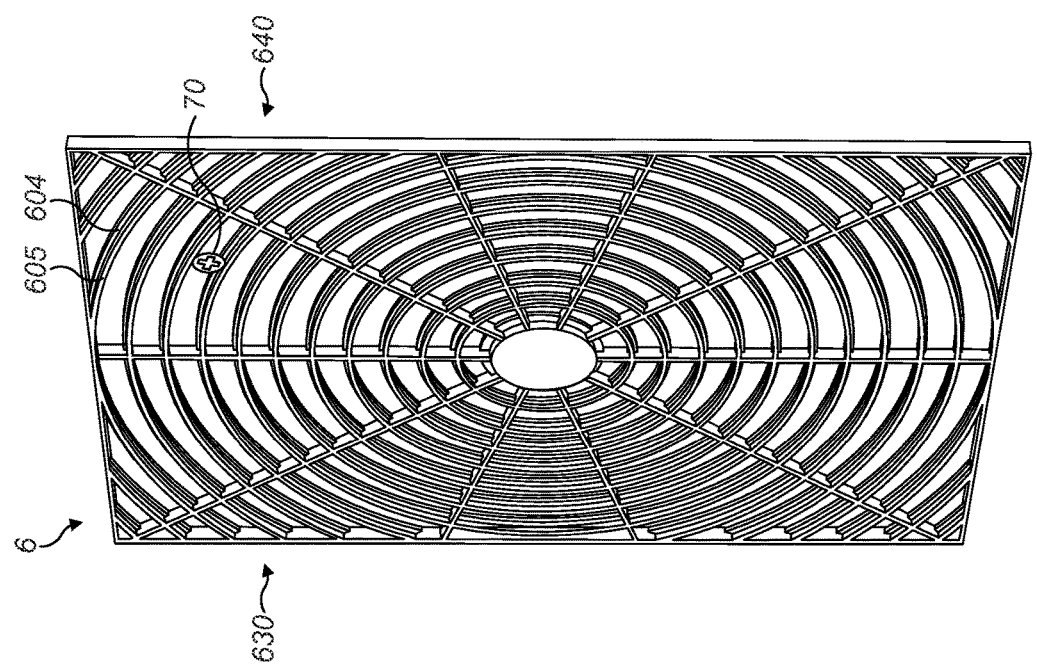
FIG. 7 shows an isometric view of an equipment side of the device of FIG. 7.

In the same way as is indicated in FIG. 4, the openings and/or indicator means illustrated on the device of FIGS. 1 to 3 can be applied to the device 6 of FIGS. 6 to 8, as indicated in dashed lines at 621, 622, 623 and 624.

FIG. 7 shows a perspective view of a front, or equipment-facing, face 630, where it can be seen more clearly how the curved intermediate members may be provided with upstands 605 and shoulders 604 to engage fixing means such as a screw head 70 located in the slot. As with the slots of FIG. 4, the screw head 70 can be located generally between a front face 630, and a rear, or surface-facing face 640 of the device 6. The upstands of any of the examples are portions of the intermediate members separating the slots, which extend in a direction oriented between the front and rear faces of the device. The shoulders or lips of the devices generally extend laterally relative to the openings in a plane of the device.

As illustrated in FIG. 8, the rear face of the device 6 can be comprised of elements which are all substantially co-planar, to provide a substantially planar rear face, which includes slots 600, while the rear face of intermediate members 602 is substantially flat, so that the device 6 can be mounted in a substantially flat manner against a wall, ceiling or other surface to which it is mounted. The same features can be envisaged in the rear face 440 of the device 4 illustrated in FIGS. 4 and 5.

Figure 9:
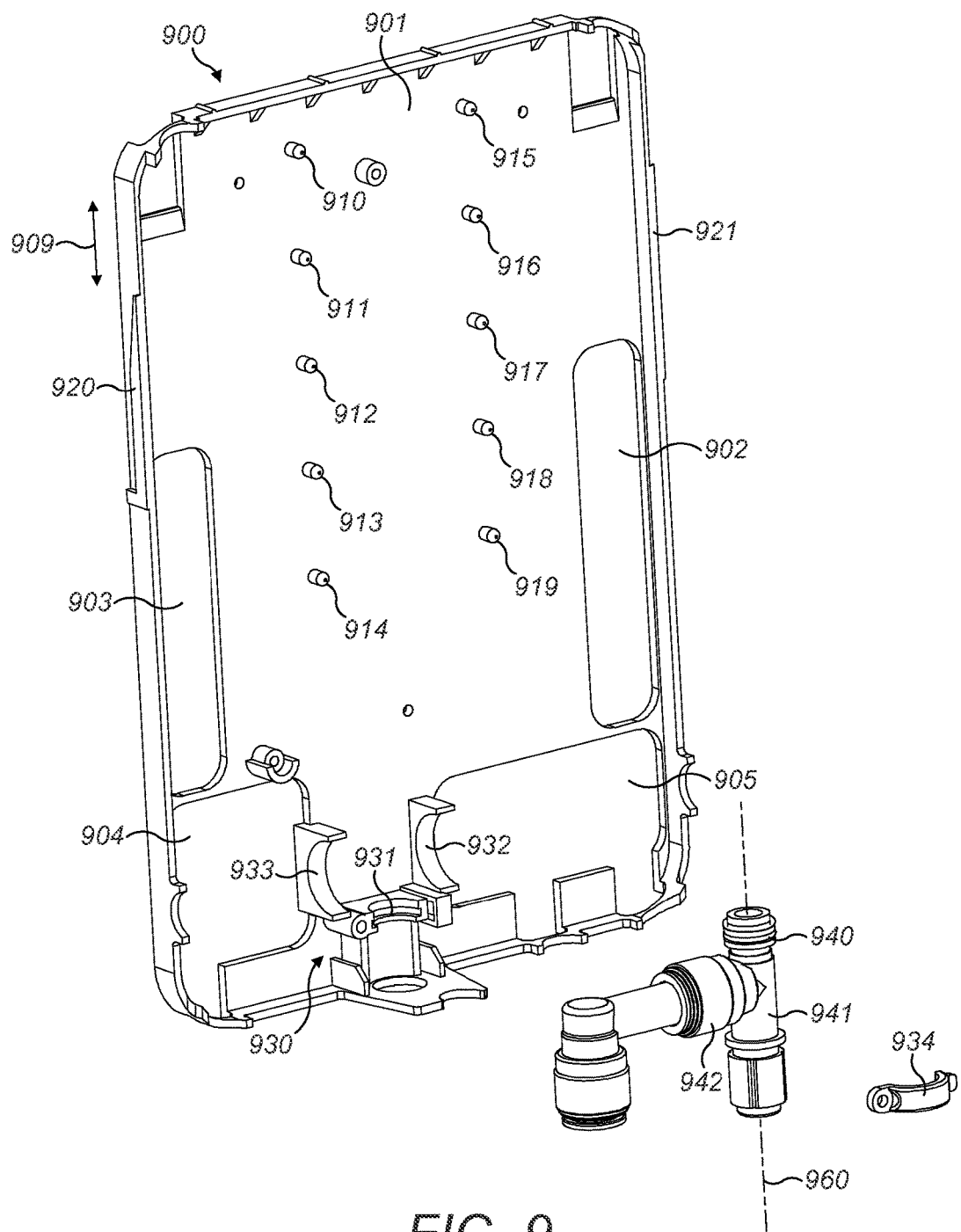
FIG. 9 shows a further preferred embodiment of a mounting device of the invention.

FIG. 9 shows a preferred embodiment of a mounting device 900 according to the invention. In this particular example, the mounting device has a single substantially unitary fixing region 901, although reinforcement members as illustrated in FIGS. 1 to 3 can optionally be included in this embodiment. It will be further appreciated that any features of the embodiments of FIGS. 1 to 8 can be combined with the features of the embodiment shown in FIGS. 9 to 15. The device is provided with a plurality of openings 902, 903, 904 and 905. Openings 902 and 903 are generally configured for an electrical cable to pass therethrough. This can allow electrical cabling to be connected to the equipment mounted to the device 900, such as an electric shower. The openings 904 and 905 are configured for a pipe, preferably a water pipe to be passed therethrough. The device also includes a plurality of integrated spacers 910, 911, 912, 913, 914, 915, 916, 917, 918, 919, which are arranged in an array spread generally across a central region of the device 900. These can act to space equipment mounted to the device 900 from the fixing region 901 and to provide support to a rear face of equipment mounted to the device 900. The device also includes slidable engagement means 920 and 921, which are arranged to enable equipment to slidably engage with the mounting device 900, in a similar manner to that illustrated and described in relation to FIGS. 1 and 2.

The device also comprises connector receiving means 930 (optionally being integrally formed on the device), which are shaped and configured to receive a connector 940, preferably connected via an adaptor assembly 941, which is received in the connector receiving means 930. The adaptor receiving means 930 comprises a first portion 931, which is configured to receive the adaptor assembly 941 and to permit the adaptor assembly 941 to rotate about an axis 960, which is generally aligned with a direction of slidable engagement of the equipment to the mounting device, in a direction as illustrated by arrow 909. The connector receiving means further comprises lateral guide portions 932 and 933, arranged to receive an extension portion 942 of the adaptor assembly 941. The extension portion 942 extends in a direction away from the axis 960 of the adaptor assembly 941. A first portion 931 of the connector receiving means locates the adaptor assembly laterally on the mounting device 900, preventing its lateral movement relative thereto. Second 932 and/or third 933 portions, which may be lateral receiving portions of the connector receiving means, disposed laterally relative to the axis 960, are arranged to prevent axial movement of the adaptor assembly 941 relative to the mounting device 900 in a direction of axis 960 of the adaptor assembly, when the extension portion 942 is received therein. Separate lateral receiving portions are disposed on first and second sides of the first, axial receiving portion, 931. The adaptor assembly 941 is also free to rotate about axis 960 when received in the connector receiving means 931, until it is secured in place by a removable securing portion 934, as is illustrated in FIG. 10.

Figure 10:
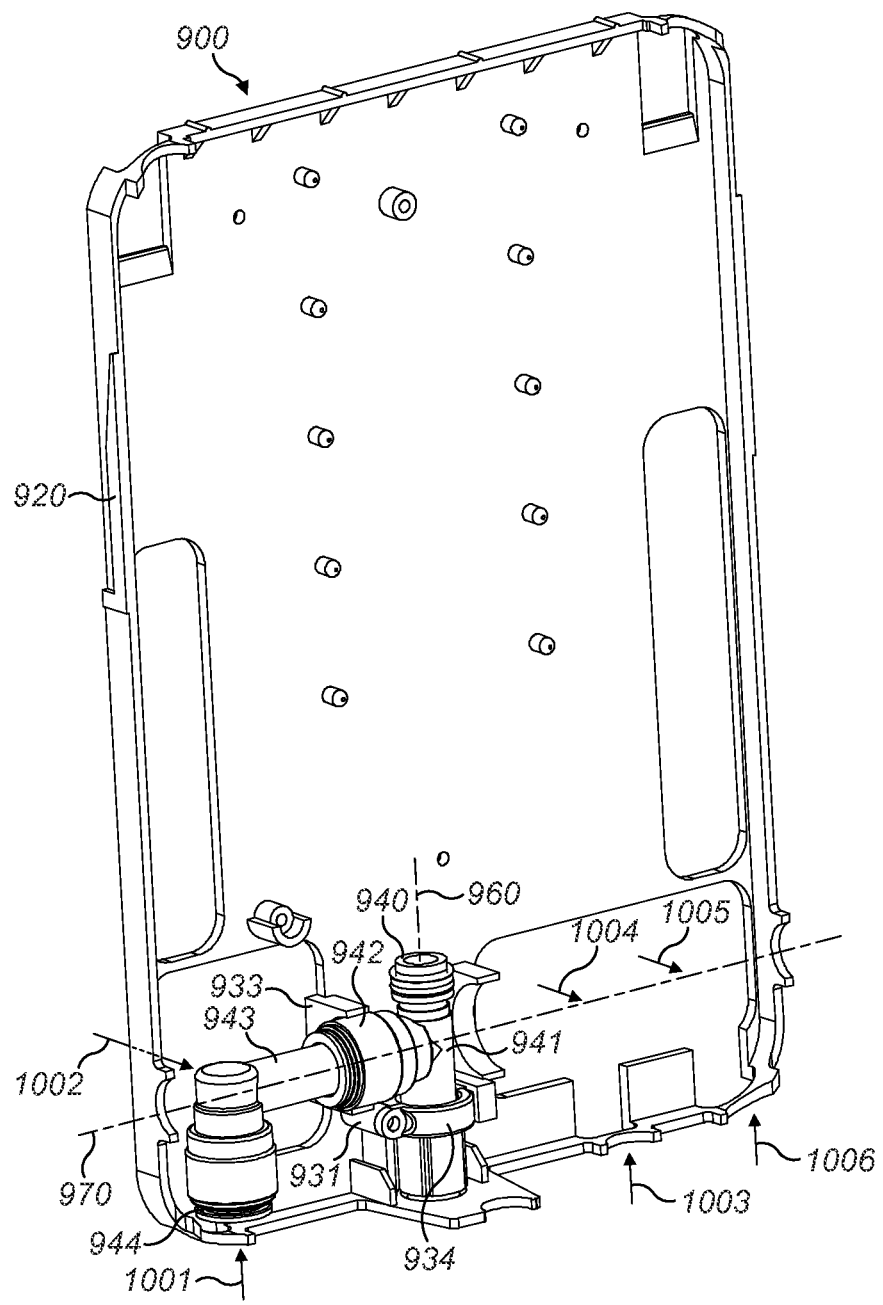
FIG. 10 shows the arrangement of FIG. 9 with an inlet adaptor assembly mounted thereto.

FIG. 10 shows the same assembly of FIG. 9, wherein the adaptor assembly 941 and its connector 940 have been assembled to the mounting device 900, which has all of the same features as are identified in FIG. 9. As can be seen in the Figure, the securing portion 934 has been located in place to maintain the adaptor assembly 941 in place in the connector receiving means 931 of the device 900, while the laterally extending portion 942 is located in lateral receiving portion 933 to prevent movement of the adaptor assembly 941 in a direction of axis 960.

By permitting rotation of the adaptor assembly 941 about axis 960, and also allowing a degree of rotation of the pipe extension 943 about axis 970, the adaptor assembly 941 can be connected to media, in this case water arriving from a water pipe, arriving from a plurality of locations and direction defined by arrows 1001, 1002, 1003 and 1004. By providing a longer, or extendible, portion of pipe in pipe extension 943, it is also possible to receive media into the adaptor assembly 941 via inlet connector 944 at locations 1005 or 1006. The invention thus provides a mounting device comprising an adjustable media connection, for media such as electricity, or water or gas or other electrical or fluid input media, the connection being configurable to receive media in any one of a plurality of predefined locations relative to the mounting device and from a plurality of directions relative to the mounting device, and/or relative to a surface to which the mounting device is mounted.

The following Figures illustrate how the arrangement also allows simultaneous mounting of equipment to mounting device 900 and connection of media to the equipment via adaptor assembly 941 and its connector 940.

Figure 11:
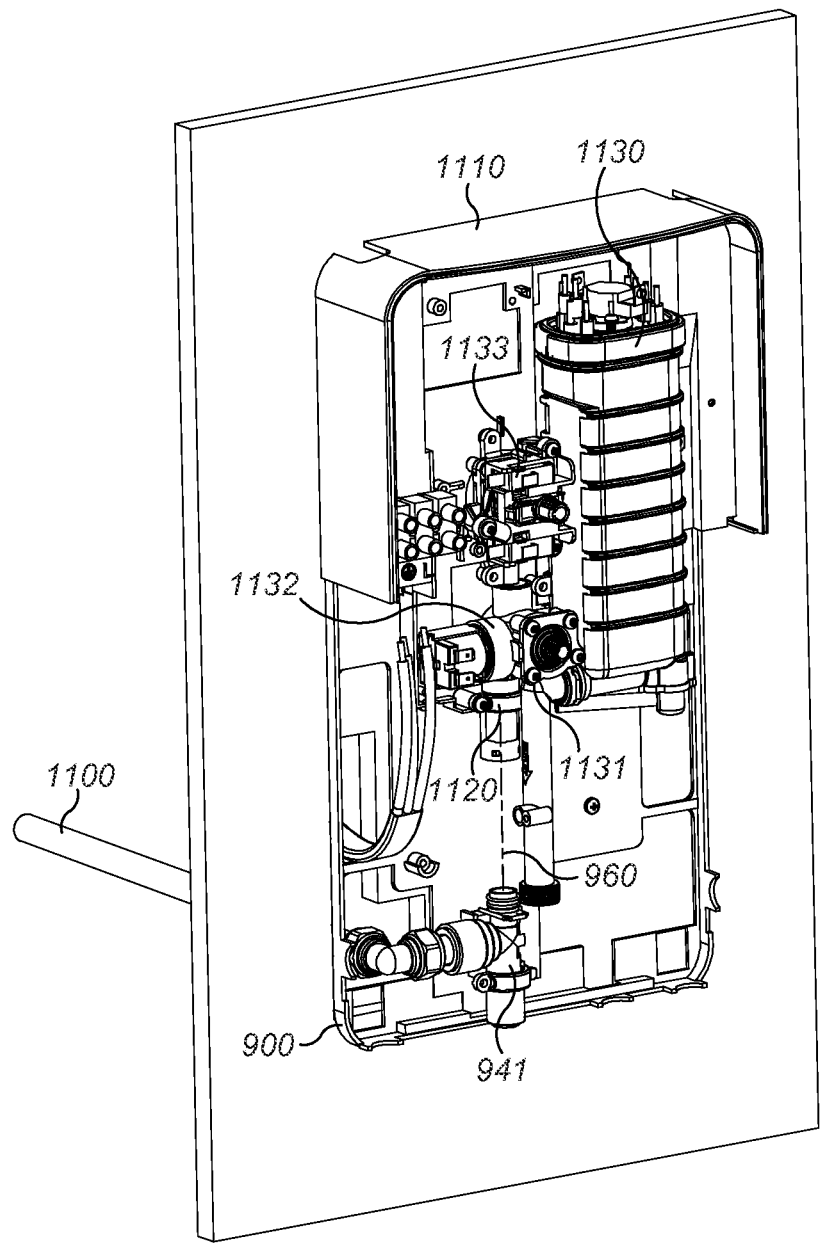
FIG. 11 shows an initial step in an installation procedure of the invention.

FIG. 11 shows mounting device 900 with the adaptor assembly 941 connected to media arriving via an inlet pipe 1100. Equipment 1110 has at this stage been offered-up to the mounting device 900 at an initial installation position, where the equipment 1110 is aligned substantially parallel with a plane of the mounting device 900, and thus a connector 1120 of the equipment is coaxially aligned with the adaptor assembly, on axis 960 of the adaptor assembly 941. In this specific example of equipment shown, the equipment is an electric shower unit, which includes a heater element 1130, which is attached to a standard stabiliser valve 1131. Stabiliser valve 1131 is selectively connected to or isolated from the water inlet connector 1120 via a solenoid 1132. A power switch 1133 controls the amount of power delivered to the heater element 1130, while the stabiliser valve 1131 controls an amount of flow through the unit, in a standard manner for electric shower units.

Figure 12A:
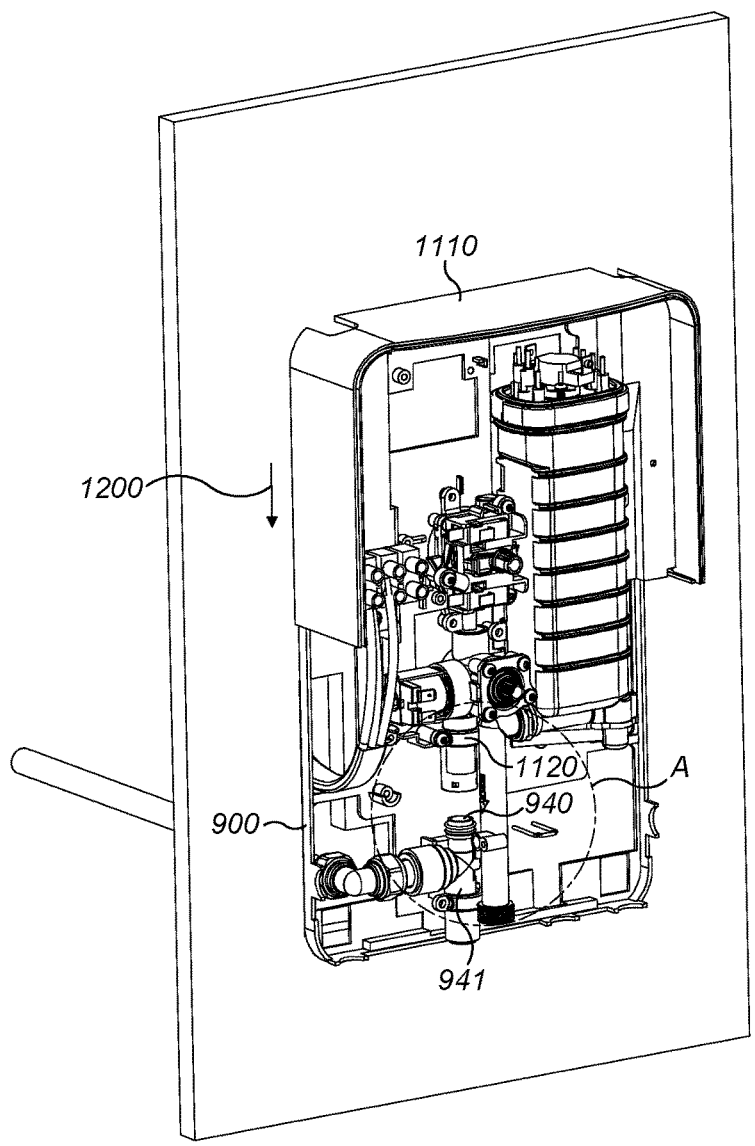
FIG. 12A shows an intermediate step in an installation procedure of the invention.

The same arrangement is shown in FIG. 12A, but where the equipment 1110 has been moved to an intermediate position of slidable engagement with the mounting device 900 in a direction of arrow 1200. This action simultaneously brings corresponding slidable engagement means of the equipment 1110 into slidable engagement with engagement means 920 of the mounting device 900. It will be appreciated that suitable engagement means on the equipment can include any projection, ridge or channel suitably configured to engage with the profile of the engagement means 920 illustrated in FIG. 10. Simultaneously with the engagement of the slidable engagement means, the inlet connector 1120 of the equipment is brought toward the connector 940 of the adaptor assembly 941 along axis the 960 of the adaptor assembly 941 shown in FIG. 11.

Figure 12B:
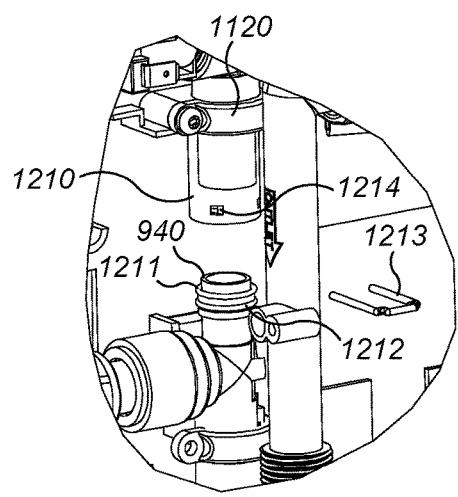
FIG. 12B is a detailed view of FIG. 12A.

FIG. 12B shows greater detail of the connector 940 and the inlet connector 1120 of the equipment. As can be seen, a connector locking means is provided in the form of a frame 1210, which is arranged to extend from the connector 1120 and past ridges 1211 and 1212 provided on connector 940. A locking element, optionally in the form of pin or pins 1213 can be provided to lock the cage 1210 in engagement with the connector 940, by retaining the pin or pins 1213 in between the ridges 1211 and 1212, as can be better seen in the arrangement of FIGS. 13A and 13B.

Figure 13A:
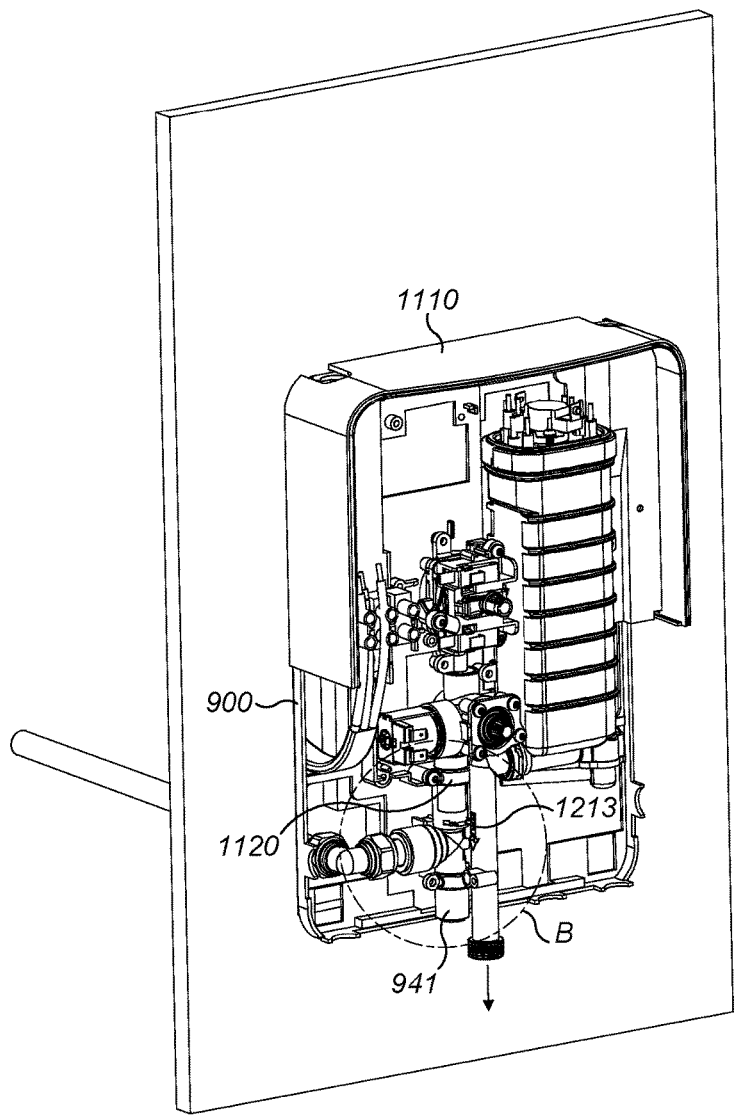
FIG. 13A shows a further step in an equipment installation procedure of the invention.

FIG. 13A shows the equipment 1110 now slid into full sliding engagement with the mounting device 900. It can be understood that the slidable engagement means 920 of FIG. 10 are now fully engaged with the necessary corresponding engagement means in the arrangement of FIG. 13. As can be seen, the inlet connector 1120 has also slid into full engagement with the connector 940 of the adaptor assembly 941. The securing pin or pins 1213, which can, as shown, be provided in the form of a substantially U-shaped securing means, has been located through openings 1214 in the cage 1210, to secure the inlet connector 1120 of the equipment in engagement with the adaptor assembly 941. This can generally secure the connection between connector 1120 and the corresponding connector 940, and can help to prevent either the operating pressure or testing pressure from blowing the connector 1120 off the connector 940 of the adaptor assembly.

Figure 13B:
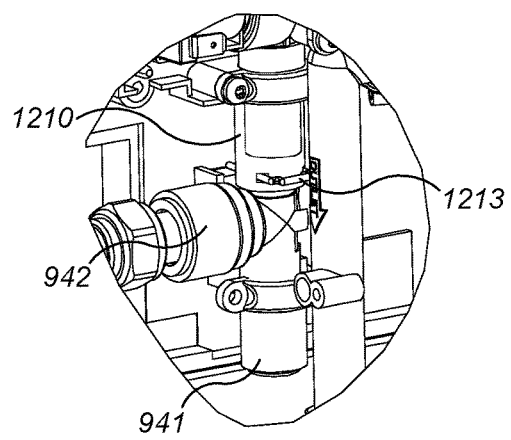
FIG. 13B is a detailed view of FIG. 13A.

Greater detail of the connection and engagement and securing arrangement can be seen in the magnified view of FIG. 13B for clarity.

Figure 14:
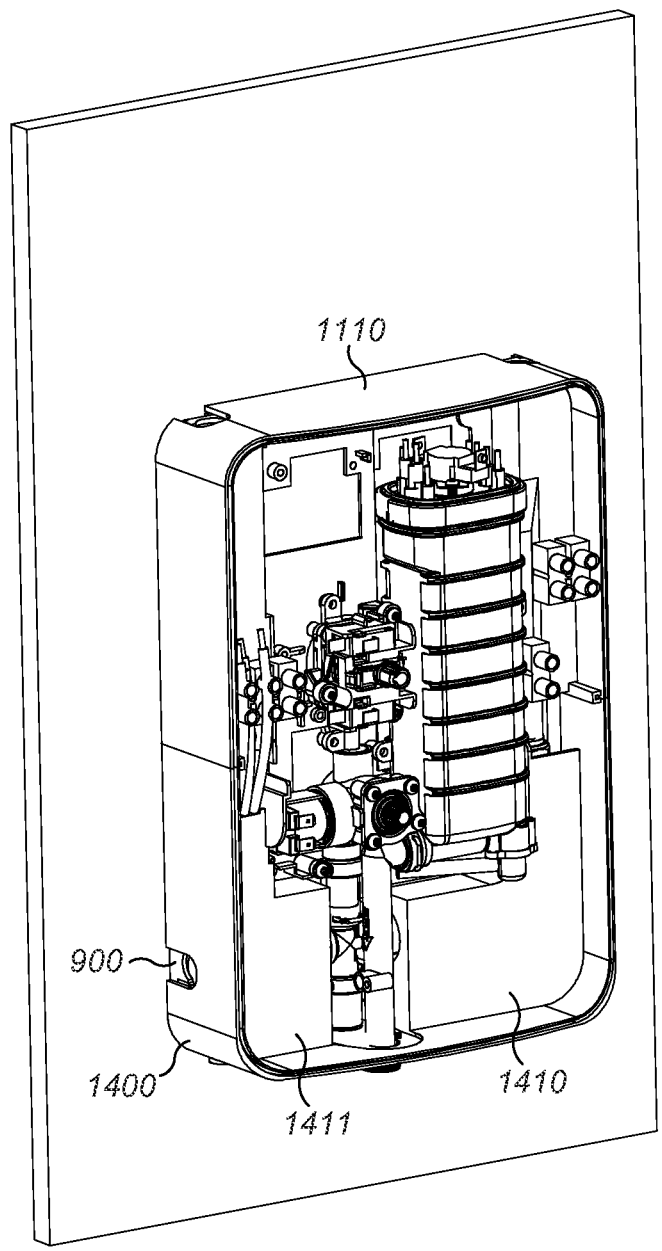
FIGS. 14 and 15 show further installation steps using equipment and methods according to the invention.

As can be seen in FIG. 14, once the equipment 1110 is mounted to the mounting device 900, further enclosing portion or portions 1400 can be assembled around the lower part of the equipment and the mounting device to conceal the media connections, such as electrical and water connections to a shower unit. These can also include internal casings connections 1410 and 1411, which may be integral with the additional enclosing portion 1400 installed during the assembly process.

Figure 15:
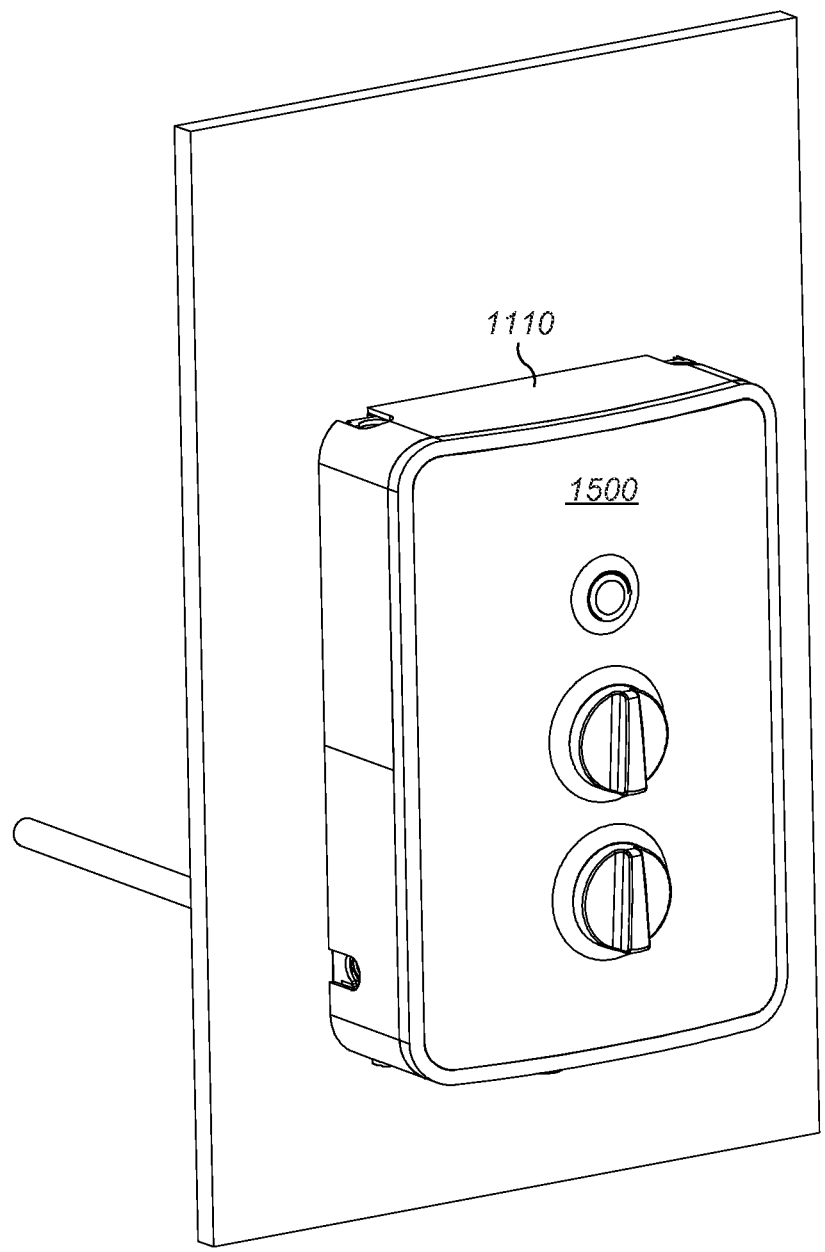

As is shown in FIG. 15, a front cover can then finally be connected to the equipment 1110 to complete the installation. As will be appreciated, the arrangement described in relation to FIGS. 9 to 15 allows greater efficiency of the installation of equipment requiring media, such as electricity and/or water connections to be carried out in an easy and efficient manner, by allowing engagement of the equipment with a mounting plate and with its required inlets for power and/or water in a single straightforward action. This speeds up the installation process and reduces the scope for connection errors, while increasing repeatability of the installation process.

Although the invention has been described above with reference to one or more preferred embodiments, it will be appreciated that various changes or modifications may be made without departing from the scope of the invention, as defined in the appended claims. It will also be apparent that features of these different embodiments can be combined both with one another and also with features of the prior art arrangements described herein in order to achieve the advantages of the invention.

The invention claimed is:

1. A mounting device for mounting a product, the product including at least one of plumbing or electrical equipment to a surface, the mounting device comprising:
a body, comprising:
an engagement arrangement for engagement with the product to be mounted on the mounting device;
an opening for allowing passage of at least one of a wire or a pipe through a plane of the body;
a fixing region configured to allow a user to locate fixing means in a fixing point, through the fixing region, to fix the mounting device to the surface;
wherein the engagement arrangement is a slidable engagement arrangement having a sliding engagement surface, the mounting device further comprising connector receiving means, shaped and configured to receive on the mounting device an adaptor for connecting at least one of a pipe or an electrical connection to the equipment, to deliver media to the equipment, so that a connection axis of the adaptor is arranged in a direction of the sliding motion, to permit the equipment to be mounted to the mounting device and the adaptor to be connected to a corresponding media connector on the equipment, in a single sliding motion.

2. A mounting device according to claim 1, comprising a connector mounted to the mounting device via the connector receiving means.

3. A mounting device according to claim 2, further comprising an adaptor connected to the connector and mountable to the mounting device in a plurality of configurations, for connecting the equipment, via the adaptor, to media at any one of a plurality of predefined locations relative to the mounting device.

4. A mounting device according to claim 3, wherein the adaptor is rotatable about the connection axis of the connector, between first and second configurations, in order to connect to the media at first and second locations relative to the mounting device.

5. A mounting device according claim 1, wherein the fixing region is a visually transparent fixing region configured to allow a user to identify a fixing point on the surface while looking through the fixing region, and to locate fixing means in the surface at the fixing point, through the fixing region, to fix the mounting device to the surface.

6. A mounting device according to claim 5, wherein at least the visually transparent fixing region comprises a transparent material.

7. A mounting device according claim 1, further comprising a reinforcement member extending across the plane of the fixing region.

8. A mounting device according to claim 1, further comprising plural openings, each for allowing passage of an electrical wire and/or a pipe through the plane of the body at different locations on the body.

9. A mounting device according to claim 1, wherein the sliding engagement surface includes a ramped protrusion.

10. A mounting device according to claim 1, wherein the connector receiving means includes a recess to receive the adaptor.

11. A mounting device for mounting a product to a surface, the product including at least one of plumbing or electrical equipment, the mounting device comprising:
a body including:
a slidable engagement arrangement having a sliding engagement surface for engagement with the product to be mounted on the mounting device;
an opening for allowing passage of at least one of a pipe or a wire through a plane of the body;
a fixing region including a fixing point configured to locate a fastener, through the fixing region, to fix the mounting device to the surface; and
a connector receiver, including a lateral guide portion shaped and configured to receive on the mounting device an adaptor for connecting at least one of a pipe or an electrical connection to the equipment, to deliver media to the equipment, and to permit the equipment to be mounted to the mounting device and the adaptor to be connected to a corresponding media connector on the equipment, in a single sliding motion, wherein a connection axis of the adaptor is arranged in a direction of the sliding motion.

12. A mounting device according to claim 11, comprising a connector mounted to the mounting device via the connector receiver.

13. A mounting device according to claim 12, wherein the adaptor is mountable to the mounting device in a plurality of configurations, for connecting the equipment, via the adaptor, to media at any one of a plurality of predefined locations relative to the mounting device.

14. A mounting device according to claim 13, wherein the adaptor is rotatable about the connection axis of the connector, between first and second configurations, in order to connect to the media at first and second locations relative to the mounting device.

15. A mounting device according claim 11, wherein the fixing region is a visually transparent fixing region configured to allow a user to identify a fixing point on the surface while looking through the fixing region, and to locate the fastener in the surface at the fixing point, through the fixing region, to fix the mounting device to the surface.

16. A mounting device according to claim 15, wherein at least the visually transparent fixing region comprises a transparent material.

17. A mounting device according to claim 11, further comprising a reinforcement member extending across the plane of the fixing region.

18. A mounting device according to claim 11, further comprising plural openings, each for allowing passage of an electrical wire and/or a pipe through the plane of the body at different locations on the body.

19. A mounting device according to claim 11, wherein the sliding engagement surface includes a ramped protrusion.

20. A mounting device according to claim 11, wherein the lateral guide portion of the connector receiver includes a recess to receive the adaptor.

* * * * *